United States Patent
Komine

(10) Patent No.: US 6,488,423 B1
(45) Date of Patent: Dec. 3, 2002

(54) SYNCHRONOUS PRINTING

(75) Inventor: Osamu Komine, Irvine, CA (US)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/578,807

(22) Filed: May 24, 2000

Related U.S. Application Data

(60) Provisional application No. 60/163,360, filed on Nov. 3, 1999, provisional application No. 60/163,272, filed on Nov. 3, 1999, provisional application No. 60/163,343, filed on Nov. 3, 1999, and provisional application No. 60/163,344, filed on Nov. 3, 1999.

(51) Int. Cl.[7] .................................................. B41J 3/42
(52) U.S. Cl. .............................. 400/70; 400/76; 400/62
(58) Field of Search ............................ 400/70, 76, 61, 400/62, 63; 399/76, 82; 358/1.9

(56) References Cited

U.S. PATENT DOCUMENTS

| | | | |
|---|---|---|---|
| 5,384,380 A | 1/1995 | Ide | 379/67 |
| 5,715,379 A | 2/1998 | Pavlovic et al. | 395/112 |
| 5,717,842 A | 2/1998 | Ambalavanar et al. | 395/115 |
| 5,771,340 A | 6/1998 | Nakazato et al. | 395/114 |
| 5,774,638 A | 6/1998 | Kageyama et al. | 395/114 |
| 5,781,710 A | 7/1998 | Fromherz et al. | 395/114 |
| 5,946,458 A | 8/1999 | Austin et al. | 395/114 |
| 5,946,461 A | 8/1999 | Landry et al. | 395/117 |
| 5,970,218 A | 10/1999 | Mullin et al. | 395/114 |
| 5,978,561 A | 11/1999 | Kimura et al. | 395/115 |
| 5,987,229 A | 11/1999 | Bender et al. | 395/114 |
| 5,995,723 A | 11/1999 | Sperry et al. | 395/114 |
| 5,995,724 A | 11/1999 | Mikkelsen et al. | 395/115 |
| 6,031,623 A | 2/2000 | Smith et al. | 358/1.14 |

FOREIGN PATENT DOCUMENTS

JP  10-35059 A  *  2/1998

* cited by examiner

Primary Examiner—Andrew H. Hirshfeld
Assistant Examiner—Mina Chau
(74) Attorney, Agent, or Firm—Arter & Hadden LLP

(57) ABSTRACT

The disclosure relates to methods and apparatus for printing a document from a computer workstation to a multifunction peripheral. Upon receiving a print command, the computer workstation determines whether the multifunction peripheral prints pages in a face-up or a face-down configuration. If the multifunction peripheral prints pages in a face-down configuration, the workstation invokes a printer driver to send the pages of the document to a print controller in reverse order. The print controller processes an initial portion of the document and sends the initial portion to the multifunction peripheral for printing. The multifunction peripheral prints the initial processing portion of the document while the controller processes the remainder of the document.

21 Claims, 3 Drawing Sheets

SYNCHRONOUS PRINTING

RELATED APPLICATION INFORMATION

This patent application claims priority to U.S. Provisional Patent Application Ser. No. 60/163,360, entitled "Synchronous Printing," filed Nov. 3, 1999, which is incorporated herein by reference.

This application is related to the following U.S. provisional patent applications, each of which were filed on Nov.3, 1999 and each of which is incorporated herein by reference: (1) U.S. Provisional Patent Application Ser. No. 60/163,272, entitled "Error Management for a Tandem Printing System"; (2) U.S. Provisional Patent Application Ser. No. 60/163,343, entitled "Generation of Cover Sheets by a Networked Printer;" and (3) U.S. Provisional Patent Application Ser. No. 60/163,344, entitled "Dynamic Load Balancing for a Tandem Printing System."

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates generally to image forming apparatuses and, more particularly, to methods and apparatuses for efficiently sending and processing a print job for an image forming apparatus.

2. Description of Related Art

Most contemporary operating systems, such as Microsoft Windows, permit a user to print a document on a printer from a networked computer workstation. The printing process typically comprises the user generating a printable document using an application program on a host computer. The host computer is often a computer workstation on a network. The application program sends the document to a printer driver, which, in conjunction with the operating system, converts the document into a language readable by the printer. The printer often comprises the combination of a printer controller coupled to a print engine. The document is then formatted by the printer controller and sent to the print engine for printing. Each step in this process is desirably performed in an efficient manner in order to minimize the time required for the printer to start outputting the document.

A printer driver is a software program or file that resides on the host computer, typically on the host computer's hard drive and run from memory (e.g., RAM), rather than the printer itself. The driver takes into account the individual characteristics of a printer and converts graphics and text into device-specific data at the time of printing. A printer driver also gives the host computer and its user an understanding of the capabilities of the printer, so that all the printer features can be used.

The printer driver normally tells the host computer what printer language the printer uses, which fonts are built in, how many paper feeders it has, what sizes of paper it can support, whether it can print duplex, etc. The language used by a printer is the set of commands it obeys to format data sent from a computer. The host computer uses the printer driver to convert the document into data readable by the printer and to embed certain printer commands in the data. The driver then sends the document to the printer controller.

The printer controller commonly comprises a processor embedded in the printer that creates an image from commands it receives from the source of the document. The controller may also comprise a dedicated computer that is not embedded in the printer. The controller performs several tasks. For example, the controller: (a) communicates with the host computer; (b) interprets the commands embedded in the document to be printed; (c) formats the document, including setting the paper size, margins, selecting fonts etc.; and (d) rasterizes the document, in which the document is typically arranged into an array of dots ready for the printer. In the rasterizing stage, the controller converts the commands received from the formatter into an array of dots. It takes the bitmap for each character of text, and places it at the specified position in the array, then overlays the array with any bitmap graphics, to generate the pattern to be printed.

After the printer controller has processed the document, the printer controller finally passes the document to the print engine for printing. Alternately, the document is loaded in a print job queue. The print engine is the device that physically forms the generated image on a recording medium such as paper. The print engine cannot begin printing the document until it receives at least one page of generated image from the printer controller.

The first page out time (FPOT) for a document is the amount of time that it takes the print engine to begin printing the first page of a document from the time that the user first sends a print command. The FPOT is dependent on various factors, including the amount of time that the printer driver takes to process the document and send the document to the controller. The FPOT is also dependent on the amount of time that the controller takes to send a generated image to the print engine and the amount of time that the print engine takes to begin printing after it receives the document. Generally, it is desirable to reduce the FPOT so that a user can receive a print job as quickly as possible. For a short print job, the total print time may be dominated by the FPOT. Even for large jobs, a longer FPOT can give the impression of overall slowness.

The FPOT of a print job may be unnecessarily increased if any of the components in the printing process sit idle waiting for any of the other components to complete its tasks. This can be seen in the case of the FPOT for a face-up printer, which is generally longer than the FPOT for a face-down printer. A face-up printer prints a document with the first printed page facing upwardly. A face-up printer prints the document in reverse order (last page of the document printed first) so that the pages of the final printed document are arranged in the correct consecutive order for the user. A face-down printer prints a document with the first page facing downwardly. A facedown printer thus prints a document in forward order (first page of the document printed first) so that the pages of the final document are arranged in correct consecutive order for the user.

The reason that a face-up printer has a longer FPOT than a face-down printer is that a face-down printer can begin printing as soon as it receives image data from the host computer. The host computer transmits each page in the same order that the pages are printed by the face-down printer. To the contrary, a face-up printer, which prints from last page to first page, cannot begin printing until it receives the entire document from the host computer. This is because the face-up printer outputs pages in the opposite order from which they are output by the host computer. The printer engine therefore may be required sit idle while it is "waiting" to receive the last page of the document from the controller. This is inefficient.

SUMMARY OF THE INVENTION

The previously described problems are solved by the method and apparatus described herein. One aspect of the invention relates to a method and apparatus for sending a document from a computer workstation to a multifunction peripheral (MFP) for printing, the MFP being communicatively coupled to a controller. The computer workstation and the controller process the document in a manner that allows the MFP to begin printing as soon as it receives image data from the controller in order to reduce down-time by the MFP.

A user at a computer workstation submits a document for printing and the computer workstation uses a printer driver to convert the document into a print file. The computer workstation then sends the print file to the controller, which processes the print file and submits it to the MFP for printing. Prior to sending the document to the controller, the computer workstation arranges the pages of the document in an order that allows the MFP to immediately begin printing upon receipt of the document from the controller. Specifically, the computer workstation arranges the pages of the document in a forward consecutive order if the multifunction peripheral prints in a face-down configuration and arranges the pages in a reverse consecutive order if the multifunction peripheral prints in a face-up configuration.

Additionally, upon receipt of the document from the computer workstation, the controller initially processes a portion of the document and then immediately sends the processed portion to the MFP. This allows the MFP to start printing the document as soon as it receives the first image data from the controller. The controller then processes the remainder of the document while the MFP is printing the initial processed portion, the remainder comprising the pages in the print job not present in the initial processing portion. The control unit then sends the remainder of the document to the multifunction peripheral for printing. The aforementioned process provides a reduced first page output time for a print job.

Still further objects and advantages attaching to the device and to its use and operation will be apparent to those skilled in the art from the following particular description.

DESCRIPTION OF THE DRAWINGS

Further objects of this invention, together with additional features contributing thereto and advantages accruing therefrom, will be apparent from the following description of a preferred embodiment of the present invention which is shown in the accompanying drawings with like reference numerals indicating corresponding parts throughout and which is to be read in conjunction with the following drawings, wherein.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

Figure 1:
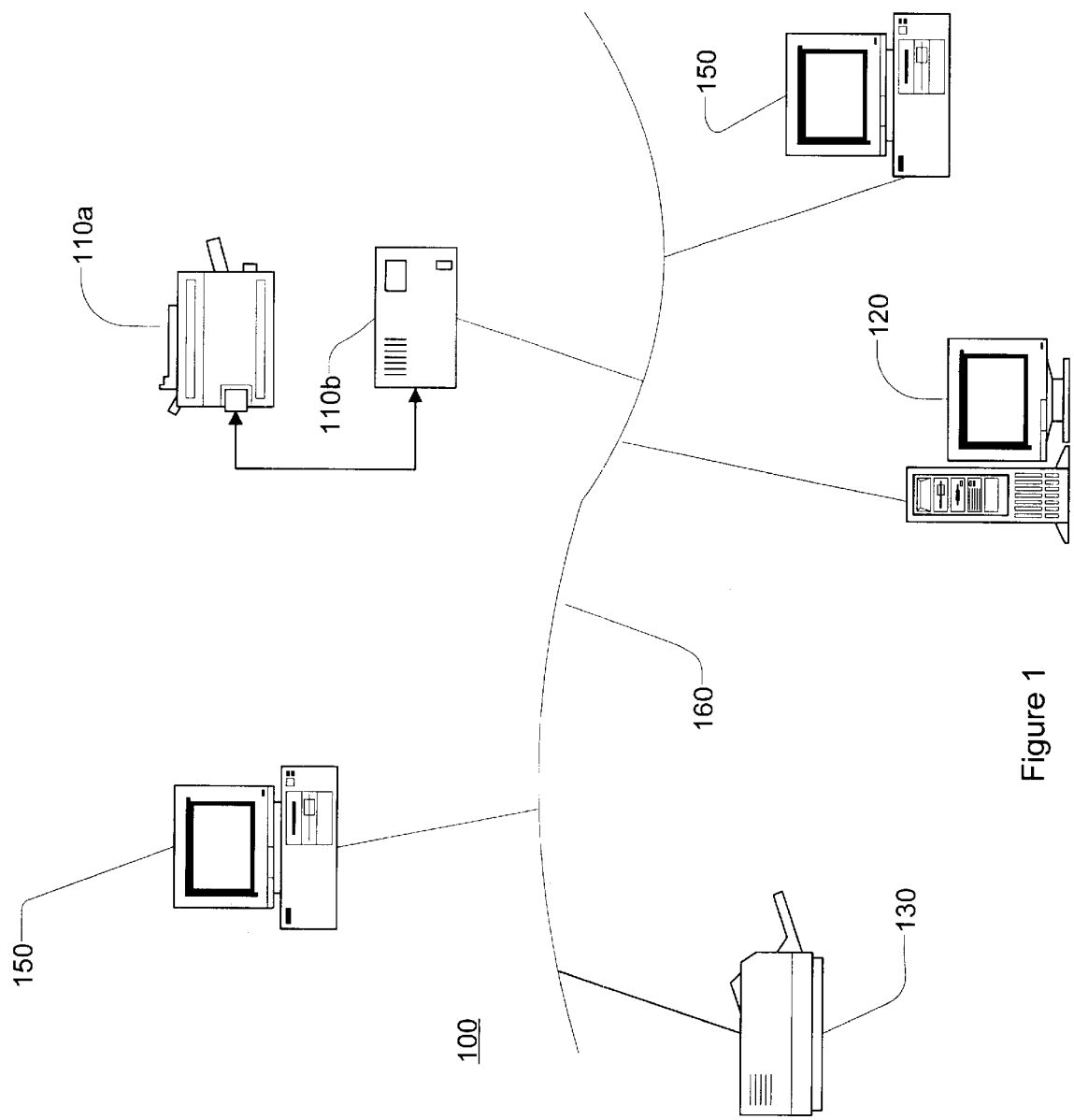
FIG. 1 is a block diagram of a LAN including a plurality of multifunction peripherals.

Referring now to FIG. 1 there is shown a block diagram of a local area network (LAN) 100 in accordance with the present invention. The LAN 100 includes a file server 120, printer 130, workstations 150, and a controller or Host 110*b* coupled to one another via network communications lines 160. The file server 120 and workstations 150 are preferably those well known in the art, such as computers having Intel Corporation (Santa Clara, Calif.) microprocessors and running Microsoft Corporation (Redmond, Wash.) Windows or Windows NT operating systems. A multifunction peripheral (MFP) 110*a* is coupled to the Host 110*b*. The LAN 100 may also include hubs, routers and other devices (not shown).

Before proceeding to describe the LAN 100, a few terms are defined. By "file server," it is meant a computer which controls access to file and disk resources on a network, and provides security and synchronization on the network through a network operating system. By "server," it is meant hardware or software which provides services to other hardware or software. By "workstation," it is meant a client computer which routes commands either to its local operating system or to a network interface adapter for processing and transmission on the network. A workstation may function as a server by including appropriate software, and may be for example, a print server, archive server or communication server. By "software" it is meant one or more computer interpretable programs and modules related and preferably integrated for performing a desired function. A "multifunction peripheral" is a peripheral which provides the functions of more than one peripheral, typically providing printing and at least one of: copying, scanning and faxing.

Figure 2:
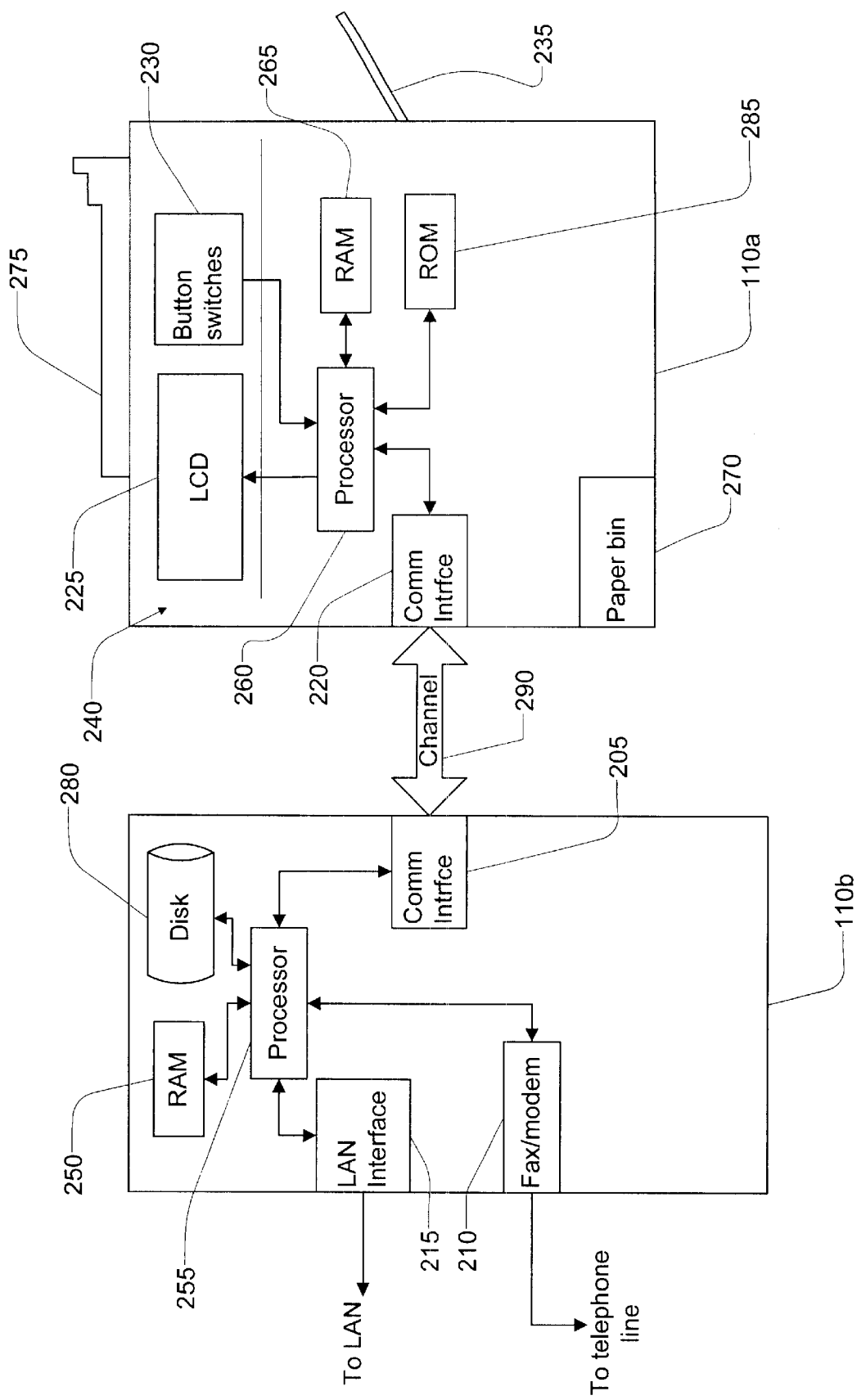
FIG. 2 is a block diagram of a data processing system including a Host and an MFP.

Turning now to FIG. 2, there is shown a block diagram of a data processing system comprising the MFP 110*a* and the Host 110*b*. The MFP 110*a* preferably comprises a high output digital copier having a communications interface 220, which as presently embodied comprises a small computer systems interface (SCSI). The MFP 110*a* further preferably comprises a hardware and software interface which allows the MFP 110*a* to receive rasterized print jobs from the Host 110*b*, manage the print jobs as well as its own copy jobs, and print the print jobs. The hardware and software interface of the MFP 110*a* further allows the MFP 110*a* to forward facsimile send jobs from the MFP 110*a* to a fax/modem 210 in the Host 110*b*. The MFP 110*a* includes a short-term memory 265, which preferably comprises random access memory (RAM) and a processor 260 in which programs are stored and run, respectively, for controlling the functions of the MFP 110*a*. The MFP 110*a* preferably also includes a long-term memory 285 such as a read only memory (ROM) or electronically programmable read only memory (EPROM). The MFP 110*a* may also include a disk drive (not shown) for both long term and short-term storage. The MFP 110*a* includes standard components including an automatic document feeder 275, paper bin 270 and paper output tray 235.

The MFP 110a includes a non-fixed display 225, preferably a liquid crystal display (LCD), and a user input device 230, such as button switches. The MFP 110a has user interface software stored in the memory 285 which is responsible for displaying information on the display 225 and interpreting user inputs from the user input device 230. The non-fixed display 225 and user input device 230 comprise an operator console 240, which, together with the user interface software, comprise a panel subsystem.

The Host 110b preferably comprises a server, and is a computer having an Intel processor 255 and running Microsoft Windows NT. In conjunction with the processor 255, the Host 110b has a short term memory 250 (preferably RAM) and a long term memory 280 (preferably a hard disk) as known in the art. A fax/modem 210 is for sending and receiving facsimiles via telephone lines. The Host 110b preferably provides storage, for example in long term memory 250, for holding incoming facsimile transmissions for extended periods and in substantial amounts when a hold is placed on printing facsimile jobs. The Host 110b includes a communications interface 205 through which the Host 110b communicates with the MFP 110a via a channel 290. Preferably, the communications interface 205 is configured as a SCSI Host.

The Host 110b further preferably comprises a hardware 215 and software interface which allows the Host 110b to receive print jobs and facsimile send jobs from the LAN 100, receive facsimile jobs from the MFP 110a and transmit rasterized print jobs to the MFP 110b. The Host 110b includes management software stored in the long term memory 280 for managing print jobs, facsimile jobs and scan jobs. The Host 110b rasterizes print jobs received from the LAN 100 into print data (in a form native to the MFP 110a) and transmits the print data to the MFP 110a via the communications interface 205. The Host 110b executes facsimile send jobs, received from either the LAN 100 or the MFP 110a, on the fax/modem 210.

Figure 3:
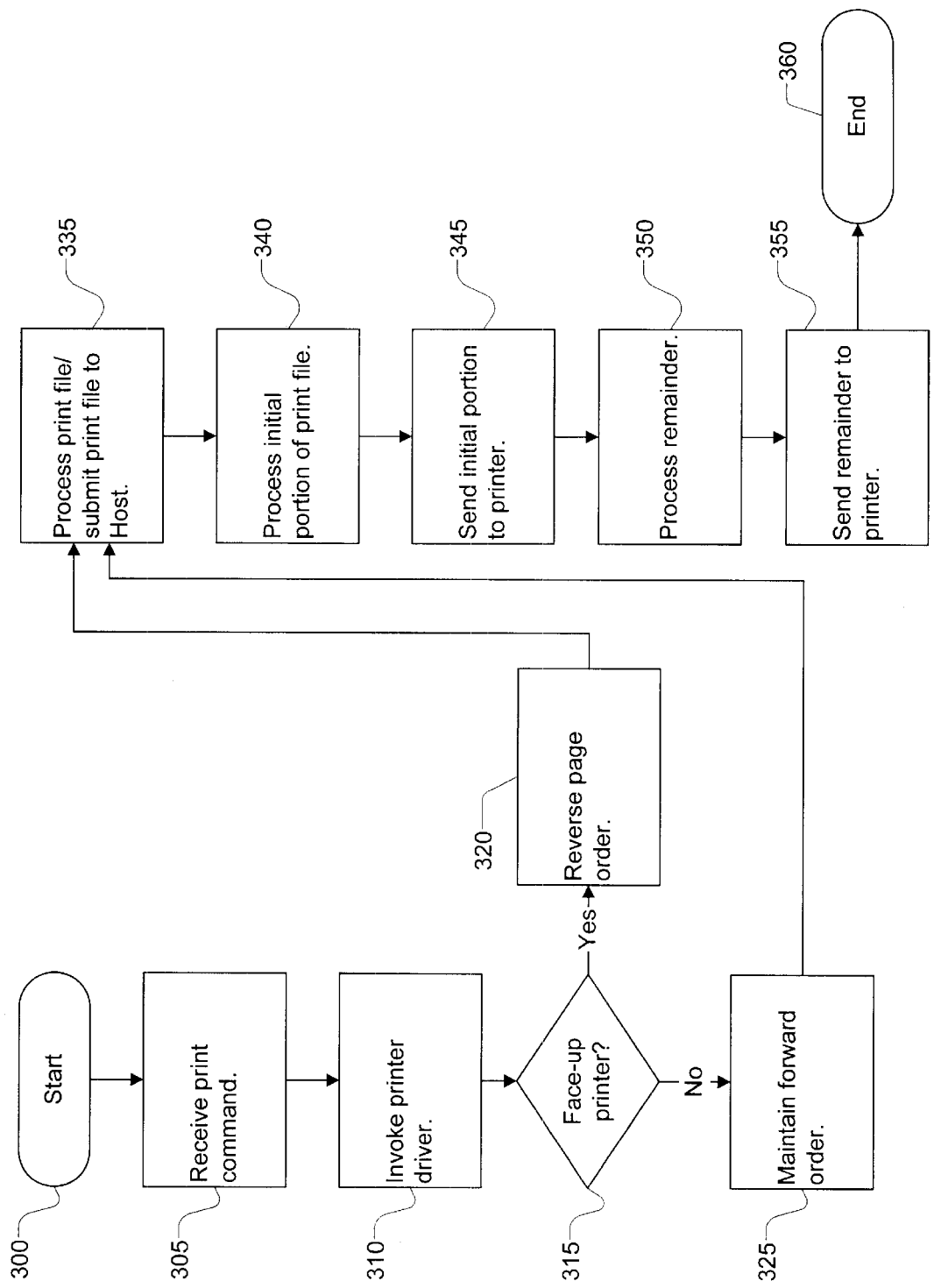
FIG. 3 is a flow chart that describes a synchronized printing system of the present invention.

FIG. 3 shows a flow chart describing a synchronized method of sending and processing documents for printing by the MFP 110a. The method begins when the computer workstation 150 receives a command from the user to print a document (step 305). This occurs when a user selects a document for printing using any appropriate software application, such as a word processor, spreadsheet application, or graphics application. A document is comprised of one or more pages arranged in a predetermined order designated by the user.

When the user submits a print request, the software application and/or the computer operating system typically generate a print file that contains all of the pages of the document in consecutive order from page 1 to page n. Page 1 is the first page of the document and page n is the last page of the document, as set forth by the user using the software application. Within the print file, the pages of the document may be arranged in a "forward order" wherein the pages are arranged consecutively from page 1 through page n. The pages of the document may also be arranged in a "reverse order" wherein the pages are arranged consecutively from page n through page 1.

Upon receiving a print command from the user, the computer workstation 150 invokes a printer driver to process the print file (step 310). The workstation 150, in conjunction with the printer driver, determines whether the MFP 110a outputs a document in a face-up configuration or in a face-down configuration (step 315). As mentioned, a face-up printer prints the document with the first page of the document facing upwardly. The last page (page n) of the document is preferably the first page printed by a face-up printer so that the user is provided with the pages in the correct order. A face-down printer prints the document with the first page of the document facing downwardly. The first page (page 1) of the document is preferably the first page printed by a face-down printer.

If the MFP 110a is a face-up printer, then the computer workstation 150, through the printer driver, rearranges the print file so that the pages are arranged in reverse order (step 320). In such a case, the internal order of the pages in the print file is from page n to page 1. The internal order is the order that the pages are arranged in the print file, regardless of the actual order of the pages as specified by the user. If the MFP is a facedown printer, then the workstation maintains the internal order of the pages in a forward order (step 325).

In step 335, the computer workstation 150 invokes the printer driver to process the print file and then sends the print file to the Host 110b (step 335). The computer workstation 150 uses the printer driver to convert the document into data readable by the MFP. The computer workstation 150 sends the pages in the print file to the Host 110b according to the internal order. In an alternative embodiment, the computer workstation 150 sends the print file directly to the Host 110b without determining whether to rearrange the page order. Thereafter, the Host 110b, rather than the computer workstation 150, performs the functions described with respect to steps 315, 320 and 325.

Once it receives the print file, the Host 110b begins processing the contents of the print file into a format that is printable by the MFP, including invoking interpretation, formatting, and rasterizing tasks for the print file. The Host 110b preferably first processes just an initial processing portion of the print file (step 340) rather than the entire print file. The initial processing portion of the print file comprises one or more of the pages in the print file, beginning with the first page in the print file according to the internal page order. In one embodiment, the initial processing portion comprises just the first page in the print file, which is either page 1 of the document (for a face-down printer) or the last page n of the document (for a face down printer.)

The Host 110b preferably maintains a print queue for the MFP 110a where it stores one or more print files that are in line for the MFP 110a. The MFP 110a maintains a buffer queue where it stores multiple pages of a print file received from the Host 110b. If there are no other print files ahead of the current print file in the Host's print queue, the Host 110b sends the initial processing portion of the print file to the MFP 110a for printing (step 345). Advantageously, the MFP 110a can immediately begin printing the first page of the current print file while the Host 110 processes the remainder of the current print file (step 350). The MFP 110a therefore does not sit idle waiting for the Host 110b to process the entire current print file. This is true regardless of whether the MFP prints face-up or face-down. If the MFP 110a is a face-up printer, then the first page of the print file is page n (the last page) of the document. If the MFP 110a is a facedown printer, then the first page of the print file is page 1 (the first page) of the document.

In another embodiment, the initial processing portion comprises any number of pages up to the maximum number n pages in the current print file. The Host 110b preferably determines the quantity of pages within the initial processing portion based upon a comparison of two time factors:

(1) the amount of time that the Host 110b requires to process the entire current print file; and (2) the amount of time that the MFP 110a requires to completely print all of the print files in the Host's print queue.

The Host 110b essentially synchronizes the amount of time that it takes to process pages in the current print file with the amount of time that the MFP 110a takes to completely print the entire print queue. Preferably, the Host 110b takes advantage of a large print queue by processing as many pages as possible while the MFP 110a is completing the print queue. On the other hand, if there are little or no print files ahead of the current print file in the print queue, then the Host 110b initially processes a smaller number of pages in the current print file. The Host 110b can then provide the MFP 110b with workable data as quickly as possible. The Host 110b then processes the remaining pages in the current print file.

If the amount of time that the Host 110b requires to process the entire print file is less than the amount of time that the MFP 110a requires to complete its current print queue, then the Host 110b preferably processes the entire print file at once. In such a case, the initial processing portion comprises the entire print file. After processing, the Host 110b then sends the print file to the print queue. The MFP 110a can then immediately begin printing the print file when the MFP 110a completes the print queue.

However, if the amount of time that the Host 110b requires to process all of the pages in the print file is greater than the amount of time that the MFP 110a requires to complete its current job queue, then the Host 110b initially processes only a portion of the print file. In such a case, the initial processing portion comprises some quantity of pages that is less than the entire number of pages in the print file. The quantity of pages that are initially processed is preferably based upon how much time the MFP 110a requires to complete its queue. The greater the amount of time that the MFP 110a requires to complete its job queue, the greater number of pages in the initial processing portion.

The Host 110b preferably polls the MFP 110a to determine the amount of time that the MFP requires to complete its current print load, if any, including any print files that are ahead of the current print file in the print queue. The Host 110b preferably considers the quantity and complexity of pages remaining in all print jobs ahead of the current print file, as well as the amount of time that the MFP 110a requires to print each of the pages. The Host 110b preferably also considers any warm-up and warm-down time that the MFP 110a requires between print jobs.

After the Host 110a determines the quantity of pages in the initial processing portion, the Host 110b processes the initial processing portion and sends it to the MFP 110a for printing (step 345). Advantageously, the MFP 110a can begin immediately printing the document upon reception of the first page of the print file while the Host 110b processes the remainder of the print file (if any).

If the initial portion comprised less than the entire print file, then the Host 110b next processes the remainder of the print file (step 350). The Host 110b then sends the remainder of the print file to the MFP 110a for printing (step 355). Again, the MFP 110a may immediately begin printing pages upon submittal by the Host 110b.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A method of sending a document to a multifunction peripheral for printing, the document comprising plural pages arranged in a forward consecutive order from a first page 1 through a last page n, the multifunction peripheral communicatively coupled to a control unit which is communicatively coupled to a computer workstation, the method comprising:

a. the control unit receiving a command to print the document;
   b. the control unit converting the document into a print file comprising the document pages described in a language understandable by the multifunction peripheral wherein, in the print file, the control unit arranges the pages in a forward consecutive order 1 through n if the multifunction peripheral prints in a face-down configuration and wherein, in the print file, the control unit arranges the pages in a reverse consecutive order n through 1 if the multifunction peripheral prints in a face-up configuration;
   c. the control unit processing an initial processing portion of the print file into a printable format, the initial processing portion comprising one or more of the pages from the print file beginning with the first page in the print file and continuing consecutively thereafter;
   d. the control unit sending the initial processing portion of the print file to the multifunction peripheral for printing;
   e. the control unit processing a remainder of the print file into a printable format, the remainder comprising the pages in the print file not present in the initial processing portion;
   f. the control unit sending the remainder of the print file to the multifunction peripheral for printing.

2. The method of sending a document to a multifunction peripheral for printing of claim 1, wherein the initial processing portion of the print file comprises the entire print file.

3. The method of sending a document to a multifunction peripheral for printing of claim 1, wherein the initial processing portion of the print file comprises only the first page in the print file.

4. The method of sending a document to a multifunction peripheral for printing of claim 1, wherein the control unit maintains a print job queue comprised of one or more print files, and wherein the control unit determines how many pages to include in the initial processing portion by comparing the amount of time that the control unit requires to process the entire print file with the amount of time that the multifunction peripheral requires to print the each of the files in the print job queue.

5. A printing system for printing a document having plural pages arranged in a consecutive order from a first page 1 to a last page n, the printing system comprising a control unit communicatively coupled to a computer workstation and to a multifunction peripheral for printing, wherein the control unit comprises instructions for causing the computer work station to:

determine whether the multifunction peripheral prints pages in a face-up configuration or in a face-down configuration;
   in response to receiving a command to print the document, convert the pages of the document into a print file comprising a language usable by the multifunction peripheral; and
   arrange the pages in the print file in a forward consecutive order of pages 1 to page n if the multifunction peripheral prints pages in a face-down configuration and arrange the pages in the print file in a reverse consecutive order of page n to page 1 if the multifunction peripheral prints pages in a face-up configuration; and wherein the control unit further includes instructions for causing the control unit to:
  initially process less than the entire number of pages in the print file beginning with the first page in the print file;
  send the processed pages to the multifunction peripheral; and
  process the remaining pages in the print file, the remaining pages comprising the pages that were not initially processed.

6. The printing system for printing a document of claim 5, wherein the control unit further includes instructions for causing the control unit to initially process only the first page in the print file.

7. The printing system for printing a document of claim 5, wherein the multifunction peripheral immediately begins printing the pages of the print file upon receiving the print file from the control unit.

8. A method of sending a document to a multifunction peripheral for printing, the document comprising plural pages arranged in a forward consecutive order from a first page 1 through a last page n, the multifunction peripheral communicatively coupled to a control unit which is communicatively coupled to the computer workstation, the method comprising:
  a. the workstation receiving a command to print the document;
  b. the workstation invoking a printer driver to convert the document into a print file comprised of each of the pages of the document described in a language understandable by the multifunction peripheral, wherein the workstation arranges the pages in the print file in an internal page order;
  c. the workstation sending the print file to the control unit;
  d. the control unit initially processing one or more of the pages in the print file into a printable format beginning with the first page of the internal order;
  e. the control unit sending the one or more processed pages of the print file to the multifunction peripheral for printing;
  f. the control unit processing the remaining, unprocessed pages of the print file into a printable format;
  g. the control unit sending the remaining processed pages of the print file to the multifunction peripheral for printing.

9. The method of sending a document from a computer workstation to a multifunction peripheral for printing of claim 8, wherein the portion of the print file initially processed comprises every page in the print file.

10. The method of sending a document from a computer workstation to a multifunction peripheral for printing of claim 8, wherein the portion of the print file initially processed comprises only the first page of the print file according to the internal order.

11. The method of sending a document from a computer workstation to a multifunction peripheral for printing of claim 8, wherein the multifunction peripheral prints pages in a face-up configuration, and wherein the internal page order comprises the pages being arranged consecutively from page n to page 1.

12. The method of sending a document from a computer workstation to a multifunction peripheral for printing of claim 8, wherein the multifunction peripheral prints pages in a face-down configuration, and wherein the internal page order comprises the pages being arranged consecutively from page 1 to page n.

13. A computer program product comprising a computer usable medium having a computer readable printer driver embodied therein for printing a document having plural pages from a computer workstation communicatively coupled to a control unit for a multifunction peripheral for printing, the printer driver including instructions for:
  a. determining whether the multifunction peripheral prints pages in a face-up configuration or in a face-down configuration;
  b. in response to receiving a command to print the document, converting the pages of the document into a print file comprising a language unit usable by the multifunction peripheral;
  c. arranging the pages in the print file in a forward consecutive order of page 1 to page n if the multifunction peripheral prints pages in a face-down configuration and arranges the pages in the print file in a reverse consecutive order of page n to page 1 if the multifunction peripheral prints in a face-up configuration;
  d. sending the print file to the control unit for processing;
  e. instructing the control unit to initially process only a portion of the print file into a printable format and thereafter send the processed portion to the multifunctional peripheral for printing;
  f. instructing the control unit to process a remaining portion of the print file into a printable format after sending the processed portion to the multifunction peripheral;
  g. instructing the control unit to send the remaining, processed portion of the print file, if any, to the multifunction peripheral for printing.

14. The computer program product of claim 13, the printer driver further including instructions for instructing the control unit to process only a first page of the print file and thereafter send the processed first page to the multifunction peripheral for printing.

15. The computer program product of claim 13, the printer driver further including instructions for instructing the control unit to initially process the entire print file and thereafter send the entire, process print file to the multifunction peripheral for printing.

16. The computer program product of claim 13, the printer driver further including instructions for instructing the control unit to cause the multifunction peripheral to begin immediately printing upon receiving a processed page from the print file.

17. A control unit configured to control a printing device with respect to the printing of a document, the control unit including computer readable code including a set of instructions for causing the control unit to:
  a. receive a command to print the document;
  b. arrange the pages of the document in a forward consecutive order 1 through n if the printing device prints in a face-down configuration and arrange the pages in a reverse consecutive order n through 1 if the printing device prints in a face-up configuration;
  c. process an initial processing portion of the document into a printable format, the initial processing portion comprising one or more of the pages from the document beginning with the first page as arranged by the control unit;

d. send the initial processing portion of the document to the multifunction peripheral for printing;

e. process a remainder of the document into a printable format, the remainder comprising the pages of the document not present in the initial processing portion;

f. sending the remainder of the document to the multifunction peripheral for printing.

18. The control unit of claim 17, wherein the control unit processing the document comprises the control unit interpretation, formatting, and rasterizing the pages of the document.

19. The control unit of claim 17, wherein the initial processing portion of the print file comprises the entire print file.

20. The control unit of claim 17, wherein the initial processing portion of the print file comprises only the first page in the print file.

21. The control unit of claim 17, wherein the control unit maintains a print job queue comprised of one or more documents, and wherein the computer readable code further includes instructions for causing the control unit to determine how many pages to include in the initial processing portion by comparing the amount of time that the control unit requires to process the entire print file with the amount of time that the printing device requires to print the each of the files in the print job queue.

* * * * *